United States Patent
Grobis et al.

(10) Patent No.: US 9,530,445 B1
(45) Date of Patent: Dec. 27, 2016

(54) PERPENDICULAR HEAT-ASSISTED MAGNETIC RECORDING (HAMR) MEDIUM WITH A PEROVSKITE OXIDE INTERMEDIATE LAYER

(71) Applicant: HGST Netherlands B.V., Amsterdam (NL)

(72) Inventors: Michael Konrad Grobis, San Jose, CA (US); Olav Hellwig, San Jose, CA (US); Bruce David Terris, Sunnyvale, CA (US); Sung Hun Wee, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 15/002,543

(22) Filed: Jan. 21, 2016

(51) Int. Cl.
| | |
|---|---|
| *G11B 5/74* | (2006.01) |
| *G11B 11/00* | (2006.01) |
| *G11B 5/65* | (2006.01) |
| *G11B 5/738* | (2006.01) |
| *G11B 5/64* | (2006.01) |
| *G11B 5/73* | (2006.01) |
| *G11B 5/40* | (2006.01) |
| *G11B 5/00* | (2006.01) |

(52) U.S. Cl.
CPC .............. *G11B 5/738* (2013.01); *G11B 5/40* (2013.01); *G11B 5/645* (2013.01); *G11B 5/653* (2013.01); *G11B 5/732* (2013.01); *G11B 2005/0021* (2013.01)

(58) Field of Classification Search
CPC ........... G11B 5/41; G11B 5/3106; G11B 5/62; G11B 5/65; G11B 5/855; G11B 5/645; G11B 5/738; G11B 13/04; G11B 5/8404; G11B 11/10584; G11B 11/10586; G11B 5/656; G11B 5/716; G11B 5/714
USPC ... 360/131; 369/13.35, 13.42; 428/829, 830, 428/836.1, 836.3, 828.1, 839.3
See application file for complete search history.

(56) References Cited

U.S. PATENT DOCUMENTS

| | | |
|---|---|---|
| 6,579,590 B2 | 6/2003 | Ju et al. |
| 8,021,771 B2 | 9/2011 | Weller et al. |
| 8,679,654 B2 | 3/2014 | Nemoto et al. |
| 8,748,349 B2 | 6/2014 | Goyal et al. |
| 8,792,211 B2 | 7/2014 | Yuan et al. |
| 8,841,007 B2 | 9/2014 | Chang et al. |
| 8,867,322 B1 | 10/2014 | Chernyshov et al. |
| 8,941,950 B2 | 1/2015 | Yuan et al. |
| 9,034,492 B1 | 5/2015 | Mallary et al. |
| 9,406,329 B1 * | 8/2016 | Ho ..................... G11B 5/738 |
| 2013/0114165 A1 | 5/2013 | Mosendz et al. |

* cited by examiner

*Primary Examiner* — Nabil Hindi
(74) *Attorney, Agent, or Firm* — Thomas R. Berthold (57) ABSTRACT

A heat-assisted magnetic recording medium has a heat-sink layer, a chemically-ordered FePt alloy magnetic layer and a perovskite oxide intermediate layer between the heat-sink layer and the magnetic layer. The perovskite oxide intermediate layer may function as both a seed layer for the magnetic layer and a thermal barrier layer, as just a seed layer for the magnetic layer, or as just a thermal barrier layer. The intermediate layer is formed of a material selected from a $ABO_3$ perovskite oxide (where A is selected from one or more of Ba, Sr and Ca and B is selected from one or more of Zr, Ce, Hf, Sn, Ir, and Nb), and a $A_2REBO_6$ rare earth double perovskite oxide (where RE is a rare earth element, A is selected from Ba, Sr and Ca, and B is selected from Nb and Ta).

20 Claims, 8 Drawing Sheets

PERPENDICULAR HEAT-ASSISTED MAGNETIC RECORDING (HAMR) MEDIUM WITH A PEROVSKITE OXIDE INTERMEDIATE LAYER

BACKGROUND OF THE INVENTION

Field of the Invention

This invention relates generally to a perpendicular magnetic recording medium for use as a heat-assisted magnetic recording (HAMR) medium, and more particularly to a HAMR medium with an intermediate layer that provides an improved thermal barrier and/or seed layer for the magnetic layer.

Description of the Related Art

In conventional continuous magnetic recording media, the magnetic recording layer is a continuous layer over the entire surface of the disk. In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_u V$, where V is the volume of the magnetic grain. Thus a recording layer with a high $K_u$ is important for thermal stability. However, increasing $K_u$ also increases the coercivity of the media, which can exceed the write field capability of the write head.

Since it is known that the coercivity of the magnetic material of the recording layer is temperature dependent, one proposed solution to the thermal stability problem is heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating temperature range of approximately 15-60° C.). In some proposed HAMR systems, the magnetic recording material is heated to near or above its Curie temperature. The recorded data is then read back at ambient temperature by a conventional magnetoresistive read head.

The most common type of proposed HAMR disk drive uses a laser source and an optical waveguide with a near-field transducer (NFT). A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the air-bearing surface (ABS) of the air-bearing slider that also supports the read/write head and rides or "flies" above the disk surface.

One type of proposed high-$K_u$ HAMR media with perpendicular magnetic anisotropy is an alloy of FePt (or CoPt) alloy chemically-ordered in the $L1_0$ phase. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The FePt alloy requires deposition at high temperature or subsequent high-temperature annealing to achieve the desired chemical ordering to the $L1_0$ phase.

The FePt alloy magnetic layer also typically includes a segregant like C, $SiO_2$, $TiO_2$, $TaO_x$, $ZrO_2$, SiC, SiN, TiC, TiN B, BC or BN that forms between the FePt grains and reduces the grain size. The use of carbon (C) has been proposed as a segregant for the FePt grains in HAMR media. To obtain the required microstructure and magnetic properties, the FePt needs to be deposited with the substrate maintained at high temperatures (e.g., about 500 to 700° C.). In published patent application US 20130114165 A1, titled "FePt—C BASED MAGNETIC RECORDING MEDIA WITH ONION-LIKE CARBON PROTECTION LAYER" and assigned to the same assignee as this application, the C segregant is described as shells of multiple graphitic carbon layers that encapsulate the FePt grains, which then have a generally spherical shape.

In HAMR media, a MgO seed layer is used to induce the desirable (001) texture to the FePt magnetic grains and influence their geometrical microstructure. However, the use of MgO as a seed layer causes multiple problems. Corrosion of the media with Mg migration to the surface of the media can cause severe head-disk interface issues, primarily due to the sensitivity/reactivity of MgO to moisture in the air. MgO is also known to have a low sputtering rate and can generate undesirable particles during radio frequency (RF) sputtering. Also, MgO has moderate thermal conductivity that limits the thermal barrier performance of the MgO layer. This can necessitate an additional barrier layer with lower thermal conductivity to keep laser power of the write head low, so that the write head remains stable with good performance over its anticipated life time and does not degrade.

What is needed is an alternative material having superior performance to MgO to not only mitigate the problems caused by MgO but also to provide a better seed and thermal barrier layer for HAMR media.

SUMMARY OF THE INVENTION

Embodiments of the invention relate to a HAMR medium with a heat-sink layer, a chemically-ordered FePt alloy magnetic layer and a perovskite oxide intermediate layer between the heat-sink layer and the magnetic layer. The perovskite oxide intermediate layer may function as both a seed layer for the magnetic layer and a thermal barrier layer, as just a seed layer for the magnetic layer, or as just a thermal barrier layer. The intermediate layer is formed of a material selected from an $ABO_3$ perovskite oxide, where A is selected from one or more of Ba, Sr and Ca and B is selected from one or more of Zr, Ce, Hf, Sn, Ir, and Nb. Rare earth double perovskite oxide materials may also form embodiments of this invention. These materials have the form $A_2REBO_6$, where RE is a rare earth element, A is selected from Ba, Sr and Ca, and B is selected from Nb and Ta. In a seed layer embodiment, the perovskite oxide may be a patterned seed layer, either as a template layer for controlling the size and distribution of the magnetic grains in a continuous magnetic layer, or as a bit-patterned seed layer for a bit-patterned media (BPM) magnetic layer.

For a fuller understanding of the nature and advantages of the present invention, reference should be made to the following detailed description taken together with the accompanying figures.

DETAILED DESCRIPTION OF THE INVENTION

Figure 1:
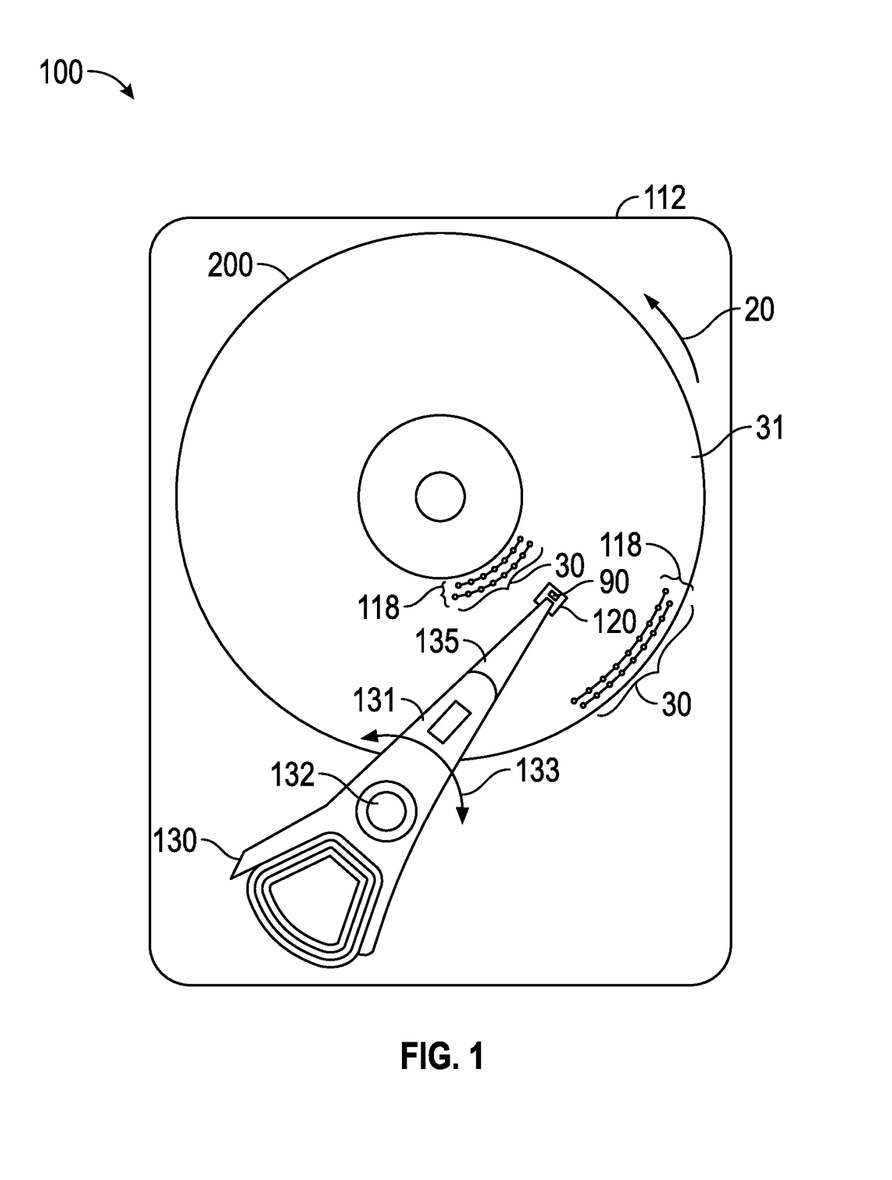
FIG. 1 is a top view of a heat-assisted magnetic recording (HAMR) disk drive according to the invention.

FIG. 1 is a top view of a heat-assisted magnetic recording (HAMR) disk drive 100 according to the invention. In FIG. 1, the HAMR disk drive 100 is depicted with a disk 200 with the magnetic recording layer 31 patterned into discrete data islands 30 of magnetizable material arranged in radially-spaced circular tracks 118. Only a few representative islands 30 and representative tracks 118 near the inner and outer diameters of disk 200 are shown. However, instead of the bit-patterned-media (BPM) shown with discrete data islands 30 in FIG. 1, the HAMR disk drive may instead use disks in which the recording layer 31 is a conventional continuous magnetic recording layer of magnetizable material.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90 may be used as the HAMR light source and is depicted as being supported on the top of slider 120. Alternatively the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
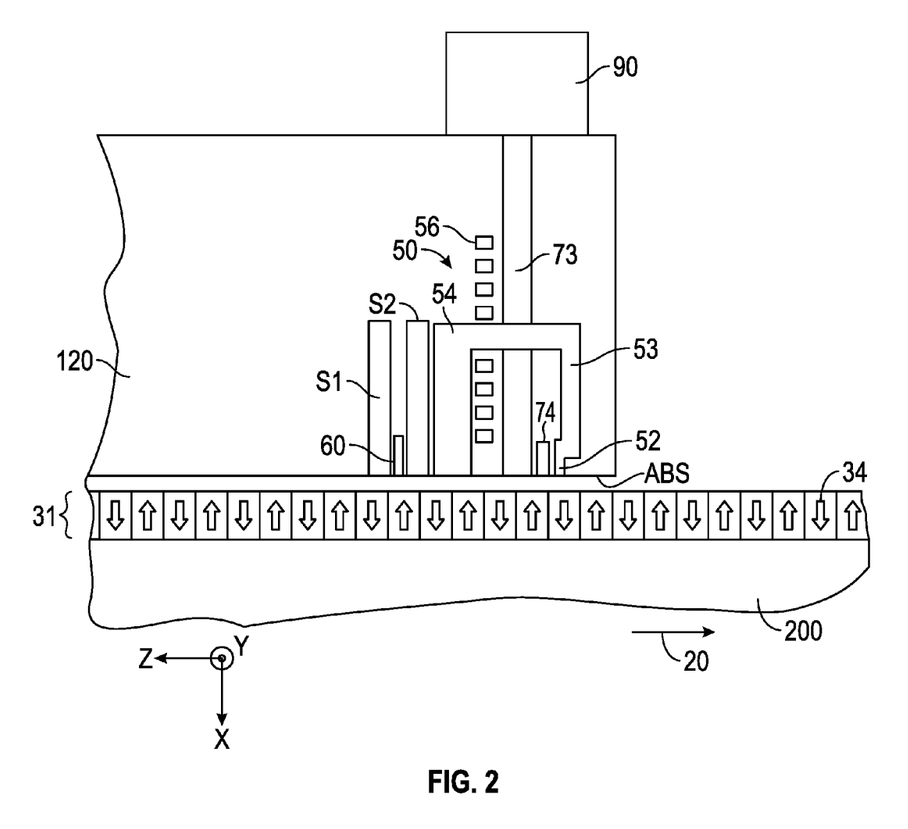
FIG. 2 depicts a sectional view, not drawn to scale because of the difficulty in showing the very small features, of an air-bearing slider for use in HAMR disk drive and a portion of a HAMR disk according to the invention.

FIG. 2 is a schematic cross-sectional view illustrating a configuration example of a HAMR head according to the present invention. The X direction denotes a direction perpendicular to the air-bearing surface (ABS) of the slider, the Y direction denotes a track width or cross-track direction, and the Z direction denotes an along-the-track direction. In FIG. 2, the disk 200 is depicted with the recording layer 31 being a conventional continuous magnetic recording layer of magnetizable material with magnetized regions or "bits" 34. The air-bearing slider 120 is supported by suspension 135 and has an ABS that faces the disk 200 and supports the magnetic write head 50, read head 60, and magnetically permeable read head shields S1 and S2. A recording magnetic field is generated by the write head 50 made up of a coil 56, a magnetic pole 53 for transmitting flux generated by the coil 56, a main pole 52, and a return pole 54. A magnetic field generated by the coil 56 is transmitted through the magnetic pole 53 to the main pole 52 arranged in a vicinity of an optical near-field transducer (NFT) 74. At the moment of recording, the recording layer 31 of disk 200 is heated by an optical near-field generated by the NFT 74 and, at the same time, a region or "bit" 34 is magnetized and thus written into the recording layer 31 by applying a recording magnetic field generated by the main pole 52.

A semiconductor laser 90 is mounted to the top surface of slider 120. An optical waveguide 73 for guiding light from laser 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $T_2O_5$ and $SiO_xN_y$, as the core material. Alternatively, $SiO_2$ may be used as the cladding material and $Ta_2O_5$, $TiO_2$, $SiO_xN_y$, or Ge-doped $SiO_2$ as the core material.

Figure 3:
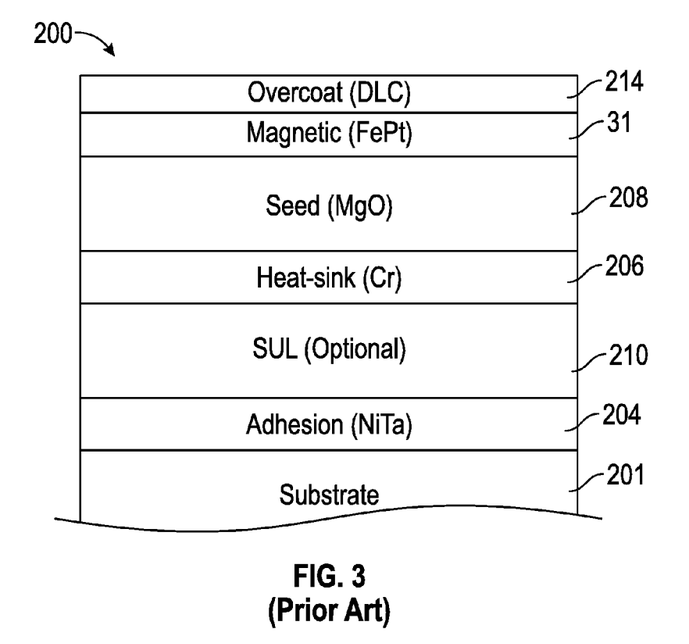
FIG. 3 is a sectional view showing a HAMR disk with a FePt continuous recording layer (RL) according to the prior art.

FIG. 3 is a sectional view showing HAMR disk 200 with a continuous recording layer (RL) 31 having a high-$K_u$. The recording layer may be comprised of a substantially chemically-ordered FePt alloy (or CoPt alloy) as proposed in the prior art. The disk 200 is a substrate 201 having a generally planar surface on which the representative layers are sequentially deposited, typically by sputtering. The hard disk substrate 201 may be any commercially available high-temperature glass substrate, but may also be an alternative substrate, such as silicon or silicon-carbide. An adhesion layer 204, typically about 10-200 nm of an amorphous adhesion layer material like a CrTa or NiTa alloy, is deposited on substrate 200.

An optional soft underlayer (SUL) 210 of magnetically permeable material that serves as a flux return path for the magnetic flux from the write head may be formed on the adhesion layer 204, or alternatively on top of heat sink layer 206. The SUL 210 may be formed of magnetically permeable materials that are also compatible with the high-temperature deposition process for FePt, such as certain alloys of CoFeZr and CoZr. The SUL 210 may also be a laminated or multilayered SUL formed of multiple soft magnetic films separated by nonmagnetic films, such as electrically conductive films of Al or CoCr. The SUL 210 may also be a laminated or multilayered SUL formed of multiple soft magnetic films separated by interlayer films that mediate an antiferromagnetic coupling, such as Ru, Ir, or Cr or alloys thereof. The SUL 210 may have a thickness in the range of about 5 to 100 nm.

Next, a heat-sink layer 206, typically about 5 to 200 nm of Ag, Al, Cu, Cr, Au, NiAl, NiTa, Ru, RuAl, W, Mo, Ta or any combination of these materials, is deposited on the SUL 210, or on the adhesion layer 204 if no SUL is used. The heat-sink layer 206 facilitates the transfer of heat away from the RL to prevent spreading of heat to regions of the RL adjacent to where data is desired to be written, thus preventing overwriting of data in adjacent data tracks.

A seed layer 208 is then deposited on the heat-sink layer 206. The seed layer is typically 2-50 nm of MgO for which the 002 crystallographic orientation is chosen to determine the subsequent crystallographic orientation of the 002-oriented FePt magnetic layer whose growth is controlled by the seed layer.

The perpendicular media that forms the RL 31 is a high-anisotropy ($K_u$) substantially chemically-ordered FePt alloy (or CoPt alloy) with perpendicular magnetic anisotropy. Substantially chemically-ordered means that the FePt alloy has a composition of the form $Fe_{(y)}Pt_{(100-y)}$ where y is between about 45 and 55 atomic percent. Such alloys of FePt (and CoPt) ordered in $L1_0$ are known for their high magnetocrystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$—X, where y is between about 45 and 55 atomic percent and the element X may be one or more of Ni, Au, Cu, Pd, Mn and Ag and present in the range of between about 0% to about 20% atomic percent. While the pseudo-binary alloy in general has similarly high anisotropy as the binary alloy FePt, it allows additional control over the magnetic and other properties of the RL. For example, Ag improves the formation of the $L1_0$ phase and Cu reduces the Curie temperature. While the method will be described for fabricating media with a FePt RL, the method is also fully applicable to media with a CoPt (or a pseudo-binary CoPt—X alloy based on the CoPt $L1_0$ phase) RL.

FePt $L1_0$ phase based thin films exhibit strong perpendicular anisotropy, which potentially leads to small (e.g., 3-9 nm in diameter) thermally stable grains for ultrahigh density magnetic recording. To fabricate small grain FePt $L1_0$ media some form of segregant to separate grains can be used as an integral part of the magnetic recording layer. Thus in the HAMR disk 200, the RL also typically includes a segregant, such as one or more of C, $SiO_2$, $TiO_2$, $TaO_x$, $ZrO_2$, SiC, SiN, TiC, TiN, B, BC, and BN that forms between the FePt grains and reduces the grain size. The use of carbon (C) atoms provides segregation of FePt grains that are well isolated and magnetically de-coupled for HAMR media.

The FePt RL is sputter deposited to a thickness of between about 4 to 15 nm while the disk substrate 201 is maintained at an elevated temperature, for example between about 300 and 700° C. The FePt RL may be sputter deposited from a single composite target having generally equal atomic amounts of Fe and Pt and with the desired amounts of X-additives and segregant, or co-sputtered from separate targets. As an alternative method for forming the FePt RL, sequential alternating layers of Fe and Pt can be deposited by sputter depositing from separate Fe and Pt targets, using a shutter to alternately cover the Fe and Pt targets, with each Fe and Pt layer having a thickness in the range of about 0.15 nm to 0.25 nm to the desired total thickness.

A protective overcoat (OC) 214 is deposited on the RL 31, preferably to a thickness between about 1-5 nm. OC 214 is preferably a layer of amorphous carbon, like amorphous diamond-like carbon (DLC). The amorphous carbon or DLC may also be hydrogenated and/or nitrogenated, as is well-known in the art. On the completed disk, a liquid lubricant, like a perfluorpolyether (PFPE), is coated on OC 214.

The use of MgO as seed layer 208 has several disadvantages. Corrosion of the media with Mg migration to the surface of the media can cause severe head-disk interface issues, primarily due to the sensitivity/reactivity of MgO to moisture in the air. Also, MgO has moderate thermal conductivity (~5 W/mK for a 5-10 nm thick MgO film) that limits the thermal barrier performance of the MgO layer. Thus an additional thermal barrier layer with lower thermal conductivity may be required to be inserted between the MgO seed layer 208 and the heat-sink layer 206.

Embodiments of this invention relate to perovskite oxides that can function as one or both a seed layer and a thermal barrier layer between the magnetic layer and the heat-sink layer in HAMR media. In one embodiment a perovskite oxide like $BaZrO_3$ (BZO) is an intermediate layer between the magnetic layer and the heat-sink layer. The perovskite oxide intermediate layer may function as both a seed layer and a thermal barrier layer, as just a seed layer for the magnetic layer, or as just a thermal barrier layer.

BZO has thermal conductivity of about 5.2 W/mK for bulk and about 0.9-1.0 W/mK for a 5-20 nm thick film, compared to MgO with about 50 W/mK for bulk and about 5 W/mK for a 5-20 nm thick film and is thus a much better thermal barrier layer than MgO. BZO also has better chemical stability than MgO in air and high humidity conditions, which results in significantly better corrosion performance of the FePt media with a BZO seed/barrier layer compared to the FePt media with a MgO seed layer.

Figure 4:
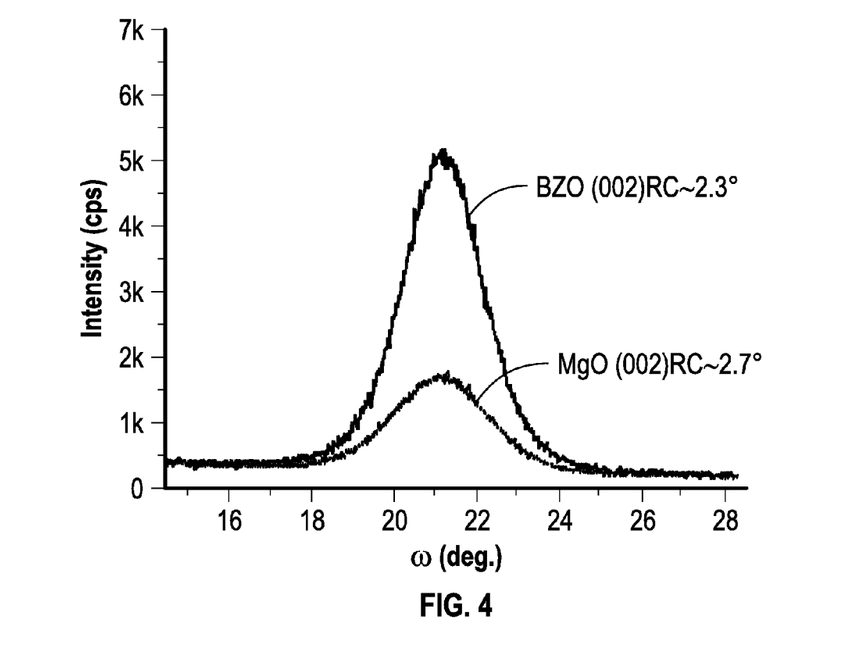
FIG. 4 is a graph of X-ray intensity as a function of incidence angle ω (i.e., a rocking curve (RC)) for $BaZrO_3$ (BZO) and MgO (002) reflections in an X-ray diffraction measurement comparing BZO and MgO films deposited on a Cr heat-sink layer on a glass substrate.

In addition, BZO has good structural and chemical compatibility with the heat-sink layer. A highly (001) textured BZO layer can be achieved directly on a Cr heat-sink layer by rf sputtering in the deposition conditions compatible with the HAMR media fabrication process. FIG. 4 is a graph of X-ray intensity as a function of incidence angle ω (i.e., a rocking curve (RC)) for BZO and MgO (002) reflections in an X-ray diffraction measurement comparing BZO and MgO films deposited on a Cr heat-sink layer on a glass substrate. The RC shows that the BZO film has a full-width-half-maximum value of RC (Δω) of about 2.3 deg. compared to about 2.7 deg. for MgO.

Figure 5:
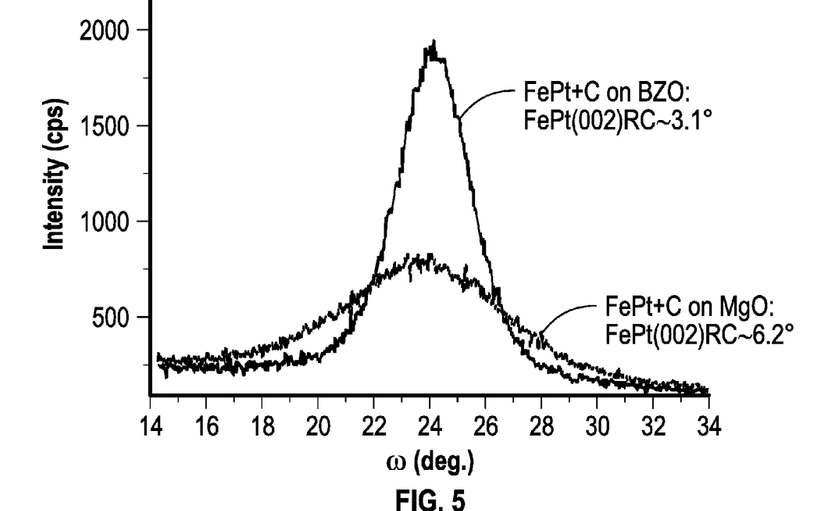
FIG. 5 is the FePt (002) RC of FePt+32% C 10 nm thick films prepared on glass substrates with 15 nm thick BZO and MgO seed layers.
Figure 6:
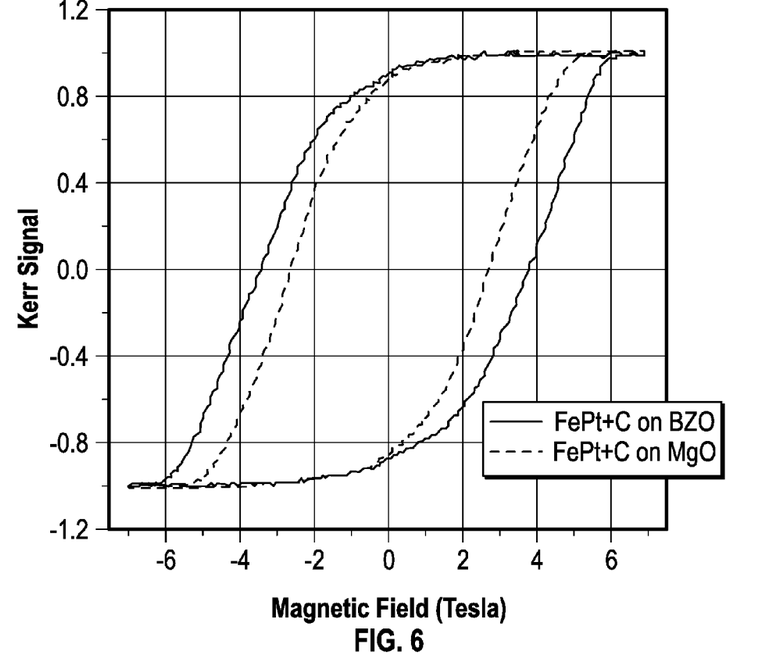
FIG. 6 is a polar Kerr loop comparing FePt+C 10 nm thick films on a BZO 15 nm thick seed layer and a MgO 15 nm thick seed layer.

It has also been demonstrated that the FePt magnetic layer with segregants (e.g., C) deposited directly on a BZO seed layer has FePt grains separated by segregant phase and excellent (001) texture and good $L1_0$ chemical ordering. X-ray diffraction analysis of FePt+32% C 10 nm thick films prepared on glass substrates with 15 nm thick BZO and MgO seed layers showed that the FePt+C film on the BZO seed layer has stronger c-axis oriented, (001) peaks and better $L1_0$ chemical ordering compared to the FePt+C film on the MgO seed layer. FIG. 5 is the FePt (002) RC of FePt+32% C 10 nm thick films prepared on glass substrates with 15 nm thick BZO and MgO seed layers. The FePt+C film on the BZO seed layer has a smaller $\Delta\omega$ of about 3.1 deg. compared to about 6.2 deg. for the FePt+C on the MgO seed layer. The FePt+C magnetic layer on a BZO seed layer shows significantly better magnetic properties than FePt+C magnetic layer on a MgO seed layer. FIG. 6 is a polar Kerr loop comparing FePt+C 10 nm thick films on a BZO 15 nm thick seed layer and a MgO 15 nm thick seed layer. The FePt+C film on the BZO layer has a more square loop with higher nucleation field ($H_n$) and coercivity field ($H_c$) than the film on the MgO seed layer.

Perovskite oxides of $SrTiO_3$ (STO) and $BaTiO_3$ have been suggested as possible seed or intermediate layers for magnetic layers in HAMR media. U.S. Pat. No. 8,679,654 B2 and U.S. Pat. No. 8,792,211 B2 suggest these Ti-containing perovskite oxides but provide no experimental data. As part of the development of embodiments of this invention, it has been discovered that STO is generally undesirable as a seed layer replacement for MgO because of the poor texture quality of the STO layer on a Cr heat sink layer on glass substrates. A RC measurement of a 20 nm STO film on a Cr heat-sink layer on a glass substrate showed a $\Delta\omega$ of about 6.4 deg., which is significantly worse than about 2.7 deg. for MgO and about 2.3 deg. for BZO.

Thus embodiments of this invention are perovskite oxide materials, like BZO, that have a cubic structure or pseudocubic structure (a structure where the a, b and c lattice constants are approximately equal and the $\alpha$, $\beta$ and $\gamma$ lattice angles are approximately 90 degrees) with lattice parameters in the range of 4.0 to 4.4 Å. This will result in 3.7-12.5% in-plane and 7.2-15.6% out-of-plane lattice mismatches with $L1_0$ ordered FePt (a=3.852 Å and c=3.713 Å). (In contrast, the lattice parameter for STO is a=3.905 Å, which would result in an in-plane lattice mismatch of only 1.4% and an out-of-plane lattice mismatch of only 5.2%). These lattice mismatches will provide enough tensile stress/strain required to develop the highly $L1_0$ ordered FePt phase in the magnetic media layer with strong (001) texture. Thus in embodiments of this invention the intermediate layer is formed of a material selected from an $ABO_3$ perovskite oxide with a cubic or pseudocubic structure with a lattice parameter in the range of 4 to 4.4 Å, where A is selected from one or more of Ba, Sr and Ca and B is selected from one or more of Zr, Ce, Hf, Sn, Ir, and Nb. Rare earth double perovskite oxide materials that have a cubic or pseudocubic structure with lattice parameters in the same range may also form embodiments of this invention. These materials have the form $A_2REBO_6$, where RE is a rare earth element, A is selected from Ba, Sr and Ca, and B is selected from Nb and Ta.

Table 1 below lists some of these $ABO_3$ and $A_2REBO_6$ materials and their lattice parameters and lattice mismatches with FePt, MgO, and Cr.

TABLE 1

|  | | Lattice mismatch (%) with | | | |
| --- | --- | --- | --- | --- | --- |
|  | Lattice parameter (a or a/2) | In-plane FePt (a = 3.852Å) | Out-of-plane FePt (c = 3.713Å) | MgO (a = 4.211Å) | Cr (2a/√2 = 4.077Å) |
| $BaZrO_3$ | 4.182 | 7.9 | 11.2 | 0.7 | 2.5 |
| $SrZrO_3$ | 4.094 | 5.9 | 9.3 | 2.9 | 0.4 |
| $CaZrO_3$ | 4.020 | 4.2 | 7.6 | 4.8 | 1.4 |
| $BaCeO_3$ | 4.377 | 12.0 | 15.2 | 3.8 | 6.9 |
| $BaHfO_3$ | 4.171 | 7.6 | 11.0 | 1.0 | 2.3 |
| $SrHfO_3$ | 4.069 | 5.3 | 8.7 | 3.5 | 0.2 |
| $BaSnO_3$ | 4.116 | 6.4 | 9.8 | 2.3 | 0.9 |
| $SrSnO_3$ | 4.025 | 4.3 | 7.8 | 4.6 | 1.3 |
| $BaIrO_3$ | 4.100 | 6.0 | 9.4 | 2.7 | 0.6 |
| $BaNbO_3$ | 4.039 | 4.6 | 8.1 | 4.3 | 0.9 |
| $Ba_2RENbO_6$ (RE = La-Lu) | 4.19-4.3 | 8.1-10.4 | 11.4-13.7 | 0.5-2.1 | 2.7-5.2 |
| $Ba_2RETaO_6$ (RE = La-Lu) | 4.19-4.3 | 8.1-10.4 | 11.4-13.7 | 0.5-2.1 | 2.7-5.2 |

Figure 7:
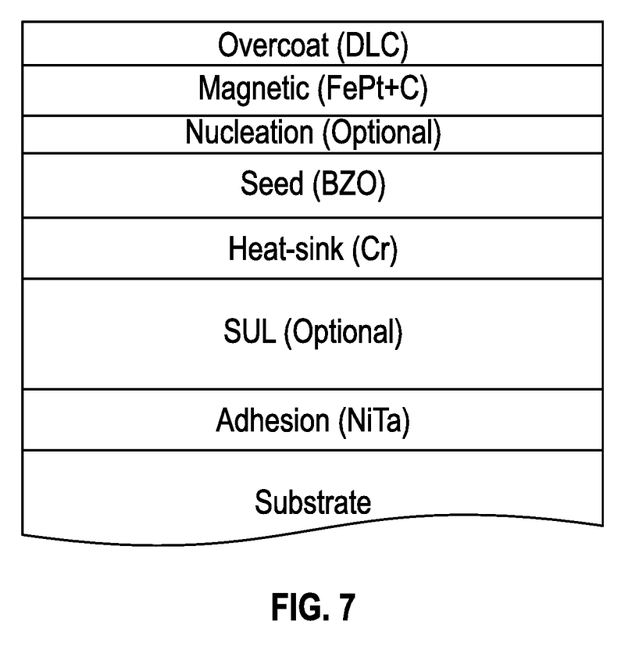
FIG. 7 is a schematic sectional view of a HAMR disk according to an embodiment of the invention where the intermediate layer is the perovskite oxide functioning as a seed layer without the need for a separate thermal barrier layer.

FIG. 7 is a schematic sectional view of a HAMR disk according to an embodiment of the invention where the intermediate layer is the perovskite oxide functioning as a seed layer without the need for a separate thermal barrier layer. The substrate, adhesion film, SUL, heat-sink layer, magnetic layer and overcoat may be materials and structure as described with respect to the prior art shown in FIG. 3. The perovskite oxide (e.g., BZO) seed layer is sputter deposited directly on the heat-sink layer (e.g., Cr). In this embodiment the seed layer may have a thickness in the range of 1 to 50 nm to function as both a thermal barrier layer and a seed layer. In the preferred embodiment the FePt+C magnetic layer is formed directly on the BZO seed layer. However, an optional thin nucleation film, for example a 0.2 to 1.0 nm thick film of C, MgO or BN, may be deposited on the BZO seed layer prior to the deposition of the FePt+C magnetic layer to tune the nucleation and grain size of the FePt grains.

Figure 8A:
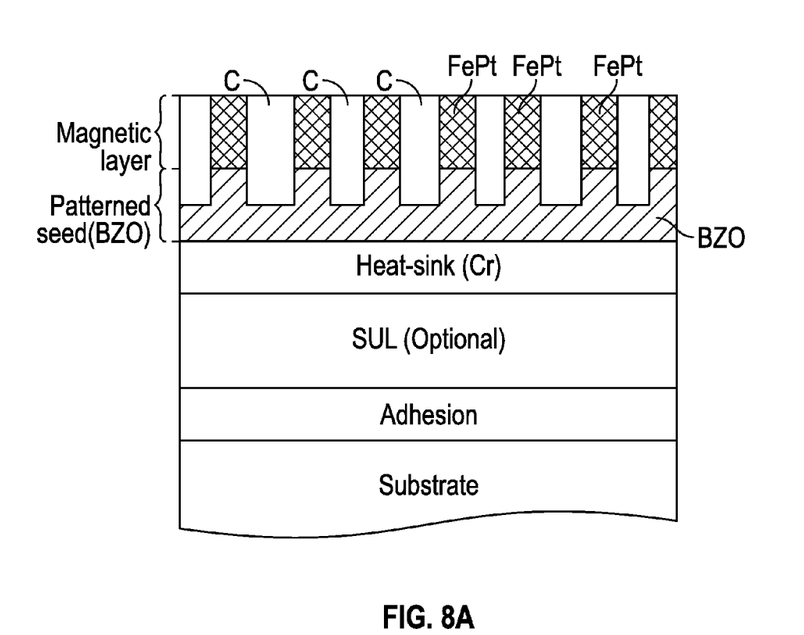
FIG. 8A is a schematic sectional view of a HAMR disk according to an embodiment of the invention where the perovskite oxide is a patterned seed layer that serves as a template layer for a continuous magnetic layer with controlled grain size and distribution.
Figure 8B:
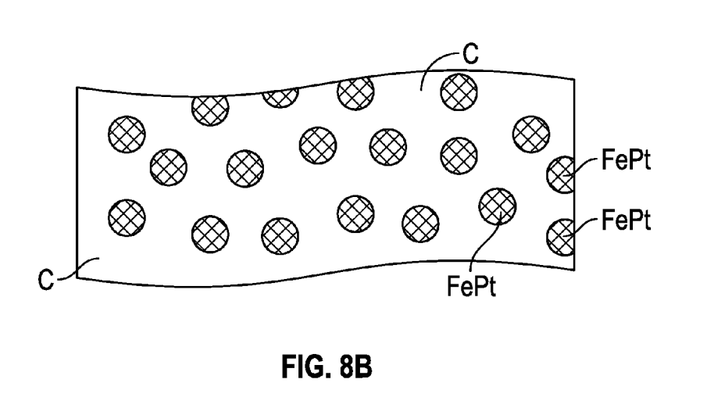
FIG. 8B is a top plan view of the magnetic layer of FIG. 8A showing the magnetic layer with magnetic grains separated by a segregant.

In the embodiment of FIG. 7, the FePt+C magnetic layer is a continuous magnetic recording layer of magnetizable material as in conventional disk drives and the BZO seed layer is formed as a continuous layer on the substrate. However, in an embodiment of the invention the perovskite seed layer may be formed as a patterned seed layer that serves as a template to control the size and distribution of the FePt grains in the magnetic layer. As shown in FIG. 8A, a layer of perovskite oxide (e.g., BZO) can be deposited as a continuous layer and then patterned, for example by imprint lithography, to form a seed layer with patterned columns or bumps. As a template layer for a continuous FePt magnetic layer, the seed layer pattern has no long range ordering. Then the FePt and C segregant can be co-sputtered onto the patterned seed layer, with the FePt grains growing on the BZO bumps or columns and the C being formed into the regions between the BZO bumps. FIG. 8B is a top plan view of the magnetic layer showing the FePt grains separated by C segregant. The FePt magnetic layer is still a continuous magnetic layer, but the FePt grains are of substantially the same size and generally equally distributed across the magnetic layer but without any long range ordering.

Figure 9A:
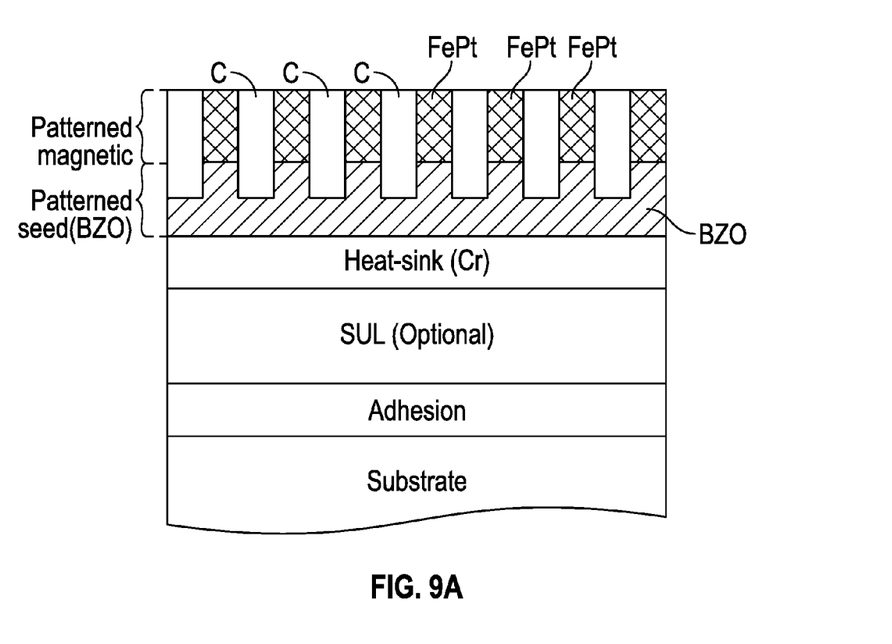
FIG. 9A is a schematic sectional view of a HAMR disk according to an embodiment of the invention where the perovskite oxide is a patterned seed layer for bit-patterned-media (BPM).
Figure 9B:
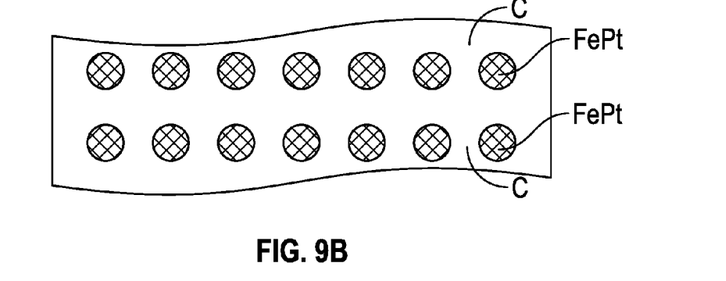
FIG. 9B is a top plan view of the magnetic layer of FIG. 8A showing the discrete magnetic bits.

Instead of disks with a continuous magnetic recording layer, the HAMR disk drive may use disks with bit-patterned-media (BPM), like that shown in FIG. 1 wherein the bits are discrete data islands 30 arranged in concentric data tracks and equally spaced along the tracks. In such an embodiment the perovskite oxide seed layer according to embodiments of this invention may be a patterned seed layer that replicates the bit-patterned magnetic layer, like that shown in FIGS. 9A-9B. A layer of perovskite oxide (e.g., BZO) can be deposited as a continuous layer and then patterned, for example lithographically or by use of self-assembled nanoparticles. Then the FePt and C segregant can be co-sputtered onto the patterned seed layer, with the FePt grains growing on the BZO bumps or columns and the C being formed into the regions between the BZO bumps. FIG. 9B is a top plan view of the magnetic layer showing the discrete FePt bits. The bit-patterned perovskite oxide seed layer can be fabricated in the same manner as the patterned seed layer shown in FIGS. 8A-8B except that the pattern is selected to have long range ordering so as to form the discrete data bits that are arranged in concentric data tracks and equally spaced along the tracks, as generally depicted in FIG. 9B. Patterned seed layers for HAMR media are described in US 2015/0017481 A1.

Figure 10:
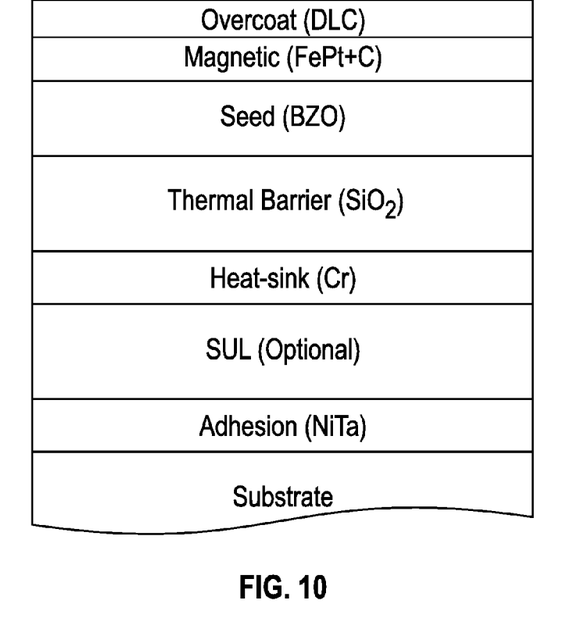
FIG. 10 is a schematic sectional view of a HAMR disk according to an embodiment of the invention where the intermediate layer is the perovskite oxide functioning as a seed layer formed on a conventional thermal barrier layer.

FIG. 10 is a schematic sectional view of a HAMR disk according to an embodiment of the invention where the intermediate layer is the perovskite oxide functioning as a seed layer formed on a conventional thermal barrier layer. The substrate, adhesion film, SUL, heat-sink layer, magnetic layer and overcoat may be materials and structure as described with respect to the prior art shown in FIG. 3. The thermal barrier layer has a low thermal conductivity, preferably less than about 2 W/mK and may be formed, for example, of $SiO_2$, yttrium-stabilized $ZrO_2$, or perovskite oxide materials with lower thermal conductivity than BZO, for example $BaCeO_3$ or $SrZrO_3$. The perovskite oxide (e.g., BZO) seed layer is sputter deposited directly on the thermal barrier layer. In this embodiment the seed layer may have a thickness in the range of 1 to 50 nm to function as just a seed layer.

Figure 11:
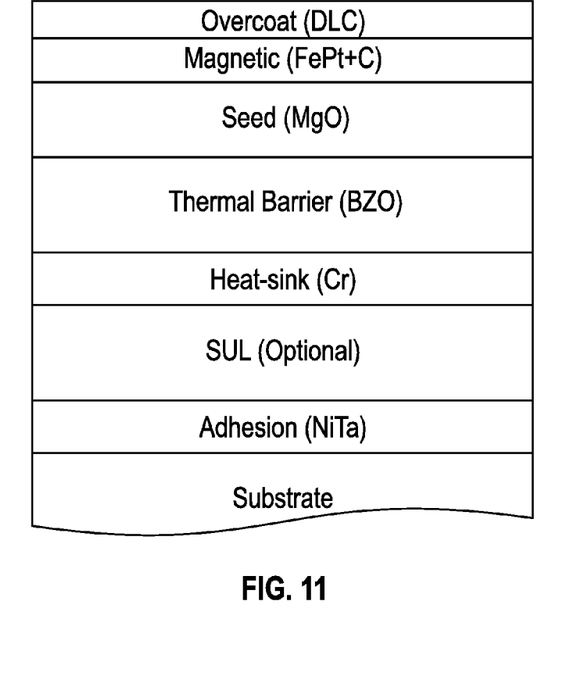
FIG. 11 is a schematic sectional view of a HAMR disk according to an embodiment of the invention where the intermediate layer is the perovskite oxide functioning as just a thermal barrier layer beneath a conventional seed layer, for example MgO.

FIG. 11 is a schematic sectional view of a HAMR disk according to an embodiment of the invention where the intermediate layer is the perovskite oxide functioning as just a thermal barrier layer beneath a conventional seed layer, for example MgO. The substrate, adhesion film, SUL, heat-sink layer, magnetic layer and overcoat may be materials and structure as described with respect to the prior art shown in FIG. 3. The perovskite oxide (e.g., BZO) thermal barrier layer is sputter deposited directly on the heat-sink layer and the seed layer is formed directly on the thermal barrier layer. In this embodiment the BZO thermal barrier layer may have a thickness in the range of 1 to 50 nm.

In FIGS. 7 and 11 the perovskite oxide intermediate layer is formed directly on the heat-sink layer. However, an amorphous underlayer, for example a 1 to 50 nm layer of a CoZrMoW alloy, a NiTa alloy, or other high-temperature material suitable for use as the SUL, may be first formed on the heat-sink layer. A nucleation film, for example 0.5 to 10 nm of a single layer or bilayer of one or more of Cr, MgO, NiW and NiWCr, is deposited on the amorphous underlayer. The perovskite oxide layer is then deposited on top of the nucleation film.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium comprising:
   a substrate;
   a heat-sink layer on the substrate;
   a magnetic layer; and
   an intermediate layer between the heat-sink layer and the magnetic layer, the intermediate layer being formed of a material selected from a $ABO_3$ perovskite oxide, where A is selected from one or more of Ba, Sr and Ca and B is selected from one or more of Zr, Ce, Hf, Sn, Ir and Nb, and a $A_2REBO_6$ rare earth double perovskite oxide, where RE is a rare earth element, A is selected from Ba, Sr and Ca, and B is selected from Nb and Ta.

2. The medium of claim 1 wherein the intermediate layer is on and in contact with the heat-sink layer.

3. The medium of claim 1 further comprising a nucleation film selected from Cr, MgO, NiW and NiWCr between the intermediate layer and the heat-sink layer and an amorphous underlayer between the nucleation film and the heat-sink layer.

4. The medium of claim 1 wherein the intermediate layer is $BaZrO_3$.

5. The medium of claim 1 wherein the intermediate layer is a seed layer for the magnetic layer and the magnetic layer is on and in contact with the seed layer.

6. The medium of claim 5 wherein the seed layer is a patterned seed layer.

7. The medium of claim 5 wherein the seed layer is a patterned seed layer and the magnetic layer is a bit-patterned magnetic layer.

8. The medium of claim 1 further comprising a nucleation film selected from C, MgO and BN between the magnetic layer and the intermediate layer.

9. The medium of claim 1 wherein the magnetic layer comprises a substantially chemically-ordered pseudo-binary FePtX alloy in the $L1_0$ phase, where X is one or more of Ni, Au, Cu, Pd, Mn and Ag.

10. The medium of claim 1 wherein the magnetic layer comprises a substantially chemically-ordered alloy comprising Pt and an element selected from Fe and Co, and a segregant selected from one or more of C, $SiO_2$, $TiO_2$, $TaO_x$, $ZrO_2$, SiC, SiN, TiC, TiN, B, BC and BN.

11. The medium of claim 1 wherein the magnetic layer consists of Fe, Pt and C.

12. A heat assisted magnetic recording (HAMR) disk drive comprising:
    the medium according to claim 1 wherein said medium is a rotatable HAMR disk; and
    a carrier maintained near the magnetic layer of said medium and supporting a near-field transducer.

13. A perpendicular heat-assisted magnetic recording (HAMR) disk comprising:

a substrate;

a heat-sink layer on the substrate;

a seed layer on the heat-sink layer and formed of a material selected from a $ABO_3$ perovskite oxide, where A is selected from one or more of Ba, Sr and Ca and B is selected from one or more of Zr, Ce, Hf, Sn, Ir and Nb, and a $A_2REBO_6$ rare earth double perovskite oxide, where RE is a rare earth element, A is selected from Ba, Sr and Ca, and B is selected from Nb and Ta; and a magnetic layer of a substantially chemically-ordered alloy comprising Fe and Pt on the seed layer, the magnetic layer further comprising a segregant selected from one or more of C, $SiO_2$, $TiO_2$, $TaO_x$, $ZrO_2$, SiC, SiN, TiC, TiN, B, BC and BN.

14. The disk of claim 13 wherein the seed layer is on and in contact with the heat-sink layer.

15. The disk of claim 13 further comprising a nucleation film selected from Cr, MgO, NiW and NiWCr between the seed layer and the heat-sink layer and an amorphous underlayer between the nucleation film and the heat-sink layer.

16. The disk of claim 13 wherein the magnetic layer is on and in contact with the seed layer.

17. The disk of claim 13 further comprising a nucleation film selected from C, MgO and BN between the magnetic layer and the seed layer.

18. The disk of claim 13 wherein the seed layer is $BaZrO_3$.

19. The disk of claim 13 wherein the seed layer is a patterned seed.

20. The disk of claim 13 wherein the magnetic layer comprises a substantially chemically-ordered pseudo-binary FePtX alloy in the $L1_0$ phase, where X is one or more of Ni, Au, Cu, Pd, Mn and Ag.

* * * * *